United States Patent [19]

Clark

[11] Patent Number: 4,904,327
[45] Date of Patent: Feb. 27, 1990

[54] METHOD OF MAKING A SUPPORT FOR TUBESHEETS IN HOLLOW FIBER PERMEATORS

[75] Inventor: George B. Clark, Clayton, Calif.

[73] Assignee: The Dow Chemical Company, Midland, Mich.

[21] Appl. No.: 344,772

[22] Filed: Apr. 26, 1989

Related U.S. Application Data

[63] Continuation of Ser. No. 838,961, Mar. 12, 1986, abandoned.

[51] Int. Cl.⁴ .............................................. B32B 31/04
[52] U.S. Cl. ................................. 156/250; 156/155; 156/207; 156/210; 156/256; 210/321.61; 210/321.89; 210/323.1; 210/323.2; 428/166; 428/178; 428/182; 428/184; 428/192; 428/906
[58] Field of Search ............... 156/155, 176, 196, 197, 156/205, 207, 210, 250, 256; 210/321.1, 321.5, 323.1, 323.2; 428/166, 178, 182, 184, 132, 137, 186, 192, 906

[56] References Cited

U.S. PATENT DOCUMENTS

| | | | |
|---|---|---|---|
| 2,406,815 | 9/1946 | Elfuing | 156/210 |
| 3,422,006 | 1/1969 | McLain | 210/321.5 |
| 3,455,460 | 7/1969 | Mahon et al. | 210/321.1 |
| 3,475,331 | 10/1969 | McLain | 210/321.1 |
| 3,700,478 | 10/1972 | Bingham | 428/323 |
| 3,702,658 | 11/1972 | McNamara et al. | 210/321.1 |
| 3,830,684 | 8/1974 | Hamon | 428/132 |
| 4,061,574 | 12/1977 | Clark | 210/321.1 |
| 4,080,296 | 3/1978 | Clark | 210/321.1 |
| 4,130,452 | 12/1978 | Indri | 156/155 |
| 4,152,302 | 5/1979 | Nonnenmann et al. | 428/133 |
| 4,267,223 | 5/1981 | Swartz | 428/186 |
| 4,471,014 | 9/1984 | Hartog et al. | 428/186 |

Primary Examiner—Caleb Weston
Attorney, Agent, or Firm—Robert R. Stringham

[57] ABSTRACT

Foraminous plates formed from coiled or parallel tape lengths may be inserted between the tubesheet and a ported casing-end in a hollow-fiber type permeator, to convey effluent from the fiber lumens to the port and to support the tubesheet against the pressure differential between its inner and outer faces. The face of the support plate which the tubesheet will bear against is defined by edges of the tapes, which are held radially or laterally apart by spacing means adapted to permit effluent flow through the plate between the tapes. Either the casing-end or the plate surface bearing against it is grooved.

8 Claims, 4 Drawing Sheets

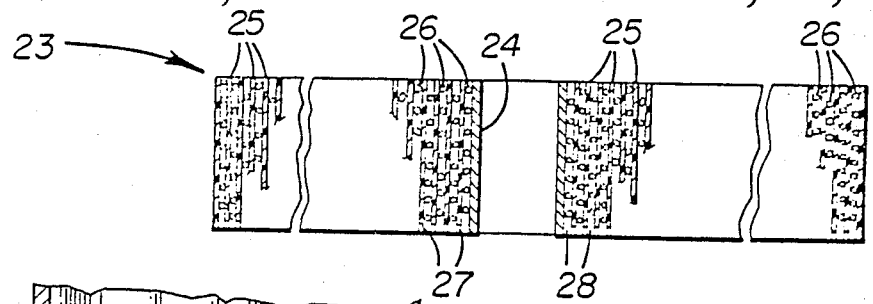
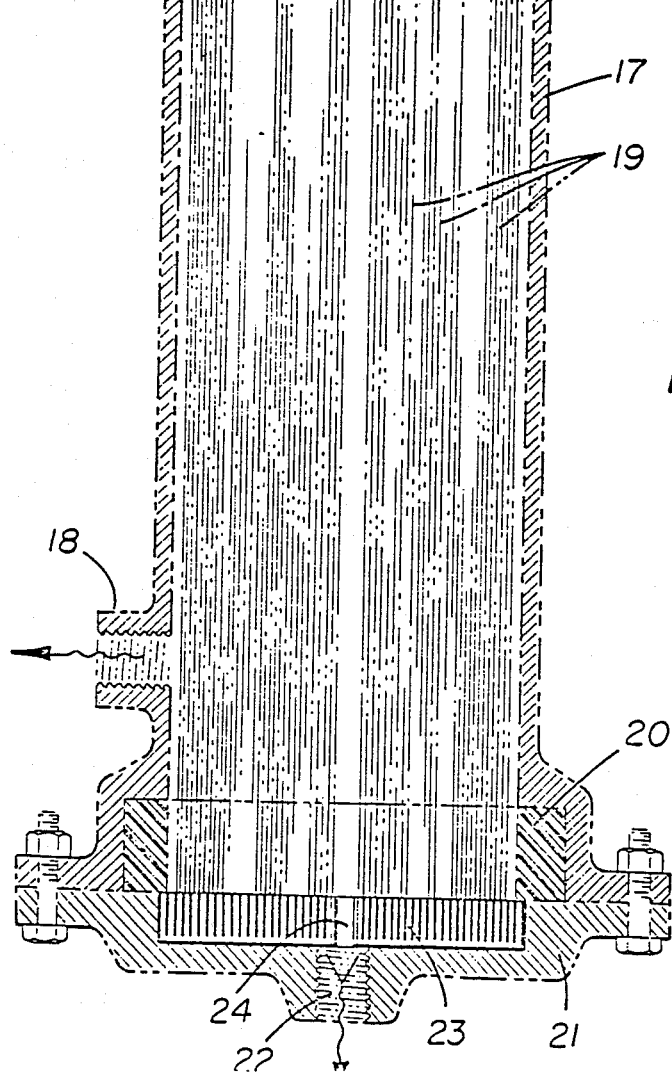
FIGURE 4B
FIGURE 4A

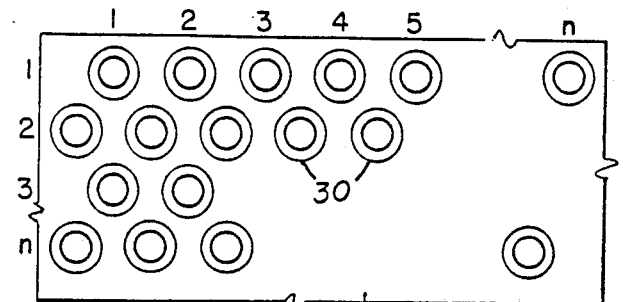
FIGURE 5A
FIGURE 5B
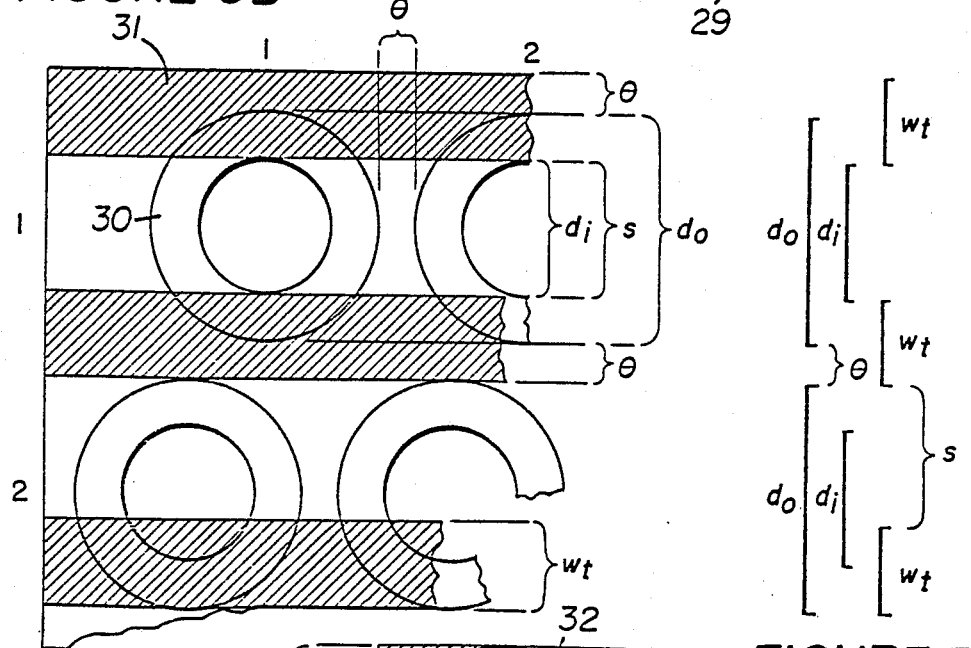
FIGURE 5C
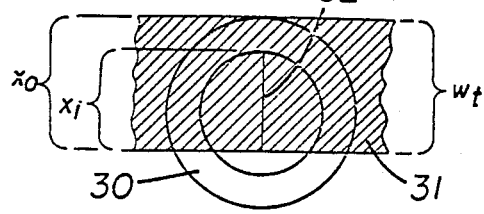
FIGURE 5E
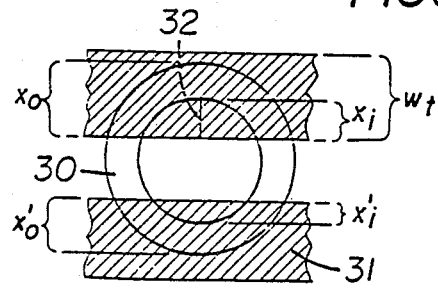
FIGURE 5D
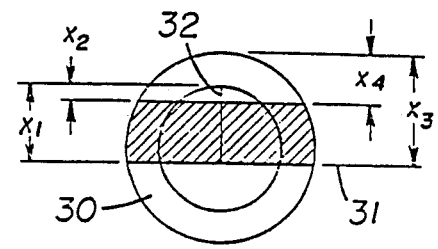
FIGURE 5F

METHOD OF MAKING A SUPPORT FOR TUBESHEETS IN HOLLOW FIBER PERMEATORS

CROSS-REFERENCE TO RELATED APPLICATION

This is a continuation, of application Ser. No. 838,961, filed Mar. 12, 1986, now abandoned.

BACKGROUND OF THE INVENTION

Permeability separatory devices in which the membrane takes the form of permeable hollow fibers are now well known. Such devices offer a high membrane area per unit volume of module and do not require membrane supporting means, even when trans-membrane pressure differentials of up to 1500 rounds per square inch are employed. However, such units have not been free of support-connected problems.

It is conventional practice to pot the ends of the hollow fibers in a solid body of resin which is conveniently referred to as a tubesheet. The face of the tubesheet is sliced off (or protruding fiber loops are cut off) to permit egress of permeate (water, for example) from the fiber lumens when the fiber/tubesheet assembly is placed, together with suitable sealing means, in a pressurizeable casing and a fluid (an aqueous brine, for example) is supplied to the exterior of the unpotted fiber portions under sufficient pressure to cause permeation through the fiber walls. The pressure differential, between the back of the tubesheet—from which the unpotted fiber portions extend—and the tubesheet face, exerts a force which can be very substantial (as in reverse osmosis processes, for example). This force tends to deform the tubesheet and results in shear stresses which can lead to failure. Thus, some means of supporting the tubesheet is generally required, even at the expense of increased resistance to permeate egress from the fiber lumens.

Perhaps the simplest prior art tubesheet support means is a perforated metal plate as disclosed in U.S. Pat. No. 3,422,008.

An alternative support means has been disclosed (for tubesheets not located at the ends of fiber bundles) in U.S. Pat. Nos. 3,455,460 and 3,475,331. The '460 patent is directed to a type of permeator in which the hollow fibers are spirally wound, in layers, around an inner, elongated core and the tubesheet is disposed longitudinally, like a dike, rising from the core to the bundle periphery and extending from one end to the other of the bundle. The fibers passing through the tubesheet are opened by routing out a trench (into which a porous support member is inserted) or by drilling holes (which may or may not penetrate the core wall). The '331 patent discloses a spherically wound hollow fiber bundle with an equatorial tubesheet (dike) which is drilled or routed to open the fiber lumens.

Another solution to the support problem is disclosed in U.S. Pat. No. 4,061,574. The tubesheet is opened for permeate egress by a plurality of bores which are generally parallel to the tubesheet face and connect with an axial conduit or a peripheral, annular conduit. The end of the tubesheet is positioned directly against (and supported by) the casing end.

By using a central, radially bored tubesheet, as disclosed in U.S. Pat. No. 4,080,296, the permeator may be otherwise designed and so operated that a "pressure balanced" condition results. That is, the pressures on the opposite faces of the tubesheet are essentially equal and "support" resides in the compressive strength of the bored tubesheet structure itself.

The nearest art to the present invention known of is the support method disclosed in U.S. Pat. No. 3,702,658. A porous body of a non-compressible material, such as sand bends or ceramic or metal frits, is disposed between the casing end and the tubesheet. Reduced resistance to permeate flow is said to result from using materials such that the solid segments of the support surface of the body are from 10 to 30 times as wide as the fiber lumen diameter, the total area of the segments is from about 30 to 70% of the total surface area and the pores making up the rest of that area have average diameters of from 1 to 3 times the fiber lumen diameter.

Of those of the foregoing methods which utilize foraminous supporting members, at least some are currently in use. Even the latter, however, need improvement as to cost effectiveness, ease of scale-up, corrosion resistance, and ease of cleaning for re-use. Also, the contact area between the tubesheet face and the solid portions of the support surface generally cannot be estimated with the accuracy desirable for design purposes.

OBJECTS OF THE INVENTION

The primary object of the present invention is to provide a type of support which can be readily fabricated, in any desired size, from inexpensive materials.

A further object is to faciitate design of the support member so as to minimize the extent of effluent flow restriction which must be accepted in order to provide an adequate and uniformly distributed contact area between the supporting member and tubesheet face.

An additional object is to make feasible the use of lightweight materials for construction of tubesheet supports, thereby effecting a reduction in the weight of the permeator in which the tubesheet and support are incorporated.

Another object is to provide a support member which requires no backing member other than a casing head having a fluid egress port.

A particular object is to provide an essentially non-corrodible support plate, i.e., a plate which can be made from plastics.

Still other objects will be made apparent to those skilled in the art by the following specification and claims.

BRIEF DESCRIPTION OF THE DRAWINGS

Several different embodiments of the invention are represented in FIGS. 1-5.

FIG. 4A is a vertical cross-sectional view of part of a hollow fiber permeator assembly comprising a tubesheet supported by a support plate similar to that depicted in FIG. 2C.

FIG. 4B is an enlarged, vertical cross-sectional view of the support plate in FIG. 4A.

FIG. 5 illustrates the use of a model to estimate the extent of lumen blockage and the tubesheet resin/tape-edge contact area when employing a supporting plate of any of the types illustrated in FIGS. 1 and 2.

SUMMARY OF THE INVENTION

Figure 1:
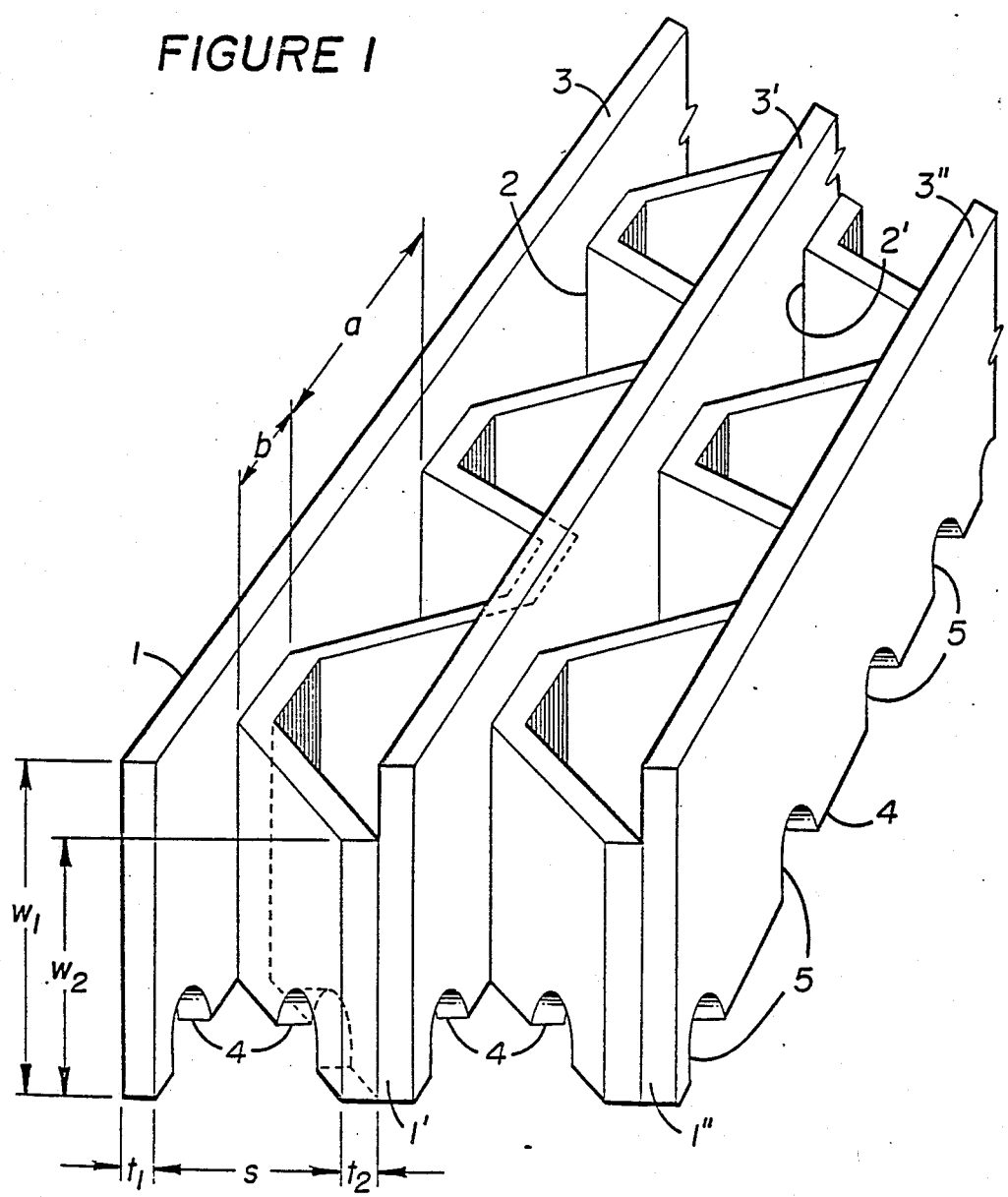
FIG. 1 is a perspective drawing (125× magnification) of a portion of a square supporting plate fabricated from alternatingly arrayed straight lengths of flat and corrugated tape.

The present invention is the method of supporting a tubesheet wherein the low pressure face of the tubesheet rests on (or in held against) the edges of a plurality of spaced-apart tape wraps and the opposed tape edges are urged against a rigid backing member; the effluent exiting from the support plate is passed on by channels in the plate or the backing member.

In one aspect, the invention may be more precisely defined as an improvement in the combination of a tubesheet and supporting means therefor. That is, the invention is definable as follows.

In a hollow fiber permeability separatory apparatus including:
 a tubesheet or wall member having first and second opposed faces,
 hollow fiber lengths having end portions passing through said tubesheet, in sealing engagement therewith, from said first face to said second face, and terminating at and opening upon said second face,
 a foraminous body for supporting said tubesheet against deformation when the fluid pressure on said first face exceeds the pressure on said second face and for coalescing and through-passing effluent flows exiting from the lumens of said fibers,
 a backing means for said body
 and means for collecting said effluent and discharging it from the permeator,
the improvement wherein
 a. said body is a plate comprising
  (1) a plurality of radially or laterally spaced-apart tape wraps or lengths, disposed generally concentrically or generally parallel to each other, the edges thereof defining opposed first and second major surfaces of said plate, and
  (2) spacing means disposed between and in contact with said supporting tape wraps or lengths and adapted to allow passage of said effluent through said plate from said first major surface to the second,
 b. said second face of said tubesheet bears against the tape edges defining said first major surface of the plate,
 c. the tape edges defining the second major surface of said plate bear against said backing member; and the latter surface, the periphery of said plate or the backing member is adapted to convey said effluent to said collection and discharge means, and
 d. said tape wraps or lengths are constrained from moving relative to said spacing means by bonding therebetween or by mechanical constraining means also included in said permeator.

Support plates of the preceding type may also be designed to function as a pressure-resistant effluent collection means between abutted tubesheets.

Preferably, the spacing means is a second tape which is narrower than the first and does not contact the tubesheet, both tapes are made of the same resinous material and they are bonded together by solvent-welding to form an integral support structure. It is particularly preferred that, in addition, the tape edges which will contact the backing member be interrupted by a plurality of openings (to permit transverse lateral flow of effluent across the backing member).

Support plates of the invention (such as that of FIG. 1, for example) in which the spacing tape edges will not contact a tubesheet bearing against the support plate are considered novel per se, i.e., as articles of manufacture, standing apart from any other permeator elements. This is particularly true of such support plates in which the major surface of the support plate which will bear on the backing member is grooved for lateral flow of effluent.

The method of making the latter articles is also considered an embodiment of the invention.

DETAILED DESCRIPTION

Plates suitable for use as tubesheet supports according to the present invention may be fabricated by rolling up or stacking non-nesting sheets, bonding—if essential to cutting or it desired—and then cutting. Preferably, however, the plates are made by rolling up together a tape and an elongate, flexible spacing means which may be—or advantageously is—a second tape (which will not nest with the first).

Wound tape supports are most conveniently made by continuous winding on a rotating mandrel (which may be quite small in diameter, depending on the flexibility of the tape) and, with the aid of suitable guide flanges, will assume essentially the cross-sectional shape of the mandrel employed. If the plate is to be formed from a single tape, the tape must be shaped in some manner, such as by random denting, irregular "crinkling" or by gluing particles on it, so that only discontinuous contact between successive layers in the roll will result. Otherwise, the completed roll will not include the between-wrap spaces essential to effluent transport.

The tapes or sheets employed in fabricating the support plates of the invention may be formed from virtually any type of material otherwise suitable in prolonged contact with the type of effluent to be produced in the permeator. Thus, plastics, metals, ceramics or paper impregnated with a resin (and cured) may be used. All of these materials, even including such inert plastics as TEFLON (registered trade name of E. I. duPont), may be bonded by known techniques.

Where a greater strength to weight ratio is desired, the plate may be formed of a curable thermoplastic and then cured. Bonding may be accomplished as part of the curing operation.

It is essential that twisting or radial (lateral) displacement of each tape wrap be resisted by the other tape wraps and/or restraining means, such as centrally and peripherally disposed rings, etc. This in turn necessitates frequent contact between the tape and the spacing means, along the length of the tape. If the tape and spacing means consist of an inherently strong material such as a metal or ceramic and/or the load to be supported is not great, bonding the disc or plate elements together into an integral structure may not be necessary. That is, once locked in place between the tubesheet and a suitably contoured backing member, the only motion of even unbonded wraps possible is that resisted by their inherent compressive strength, i.e., vertical wrinkling (with tearing, thickening, etc.) into the spaces between the spacing means and the tapes.

Constraint may also be achieved by winding under tension and securing the end of the last wrap to the underlying wrap. However, for reasons of handling ease, shape/size retention and greater resistance to deformation, bonded structures are highly preferred.

By "bonding" is meant formation of bonds at least at points or along edges of contact between the tape wraps and the intervening spacing means (such as the "bumps" on the adjacent wrap, for example). This can be done, for example, by applying an adhesive to the tape (or to a separate supporting means, such as an abacus-like array of bead strings) before or as it enters the roll. Alternatively (and preferably), bonding can be effected by solvent-welding, i.e., by briefly contacting the formed tape roll with a volatile solvent or solvent mixture to form bodies of a solution of the tape material in the narrowed spaced on each side of the lines of contact between adjacent tape wraps or lengths. The dissolved material is redeposited as a bridge or fillet, in situ, when the solvent content of the solution bodies evaporates. The roll may be dipped briefly in the solvent or sprayed with a solvent mist in order to form the solution bodies. Liquid bonding or soldering techniques of the types employed in the manufacture of "corrugated boxes" or Ford-type direct heat exchanger stacks (see FIG. 2E) are also suitable. Other known bonding techniques, such as laser welding (as the tape(s) enter the roll), may be applicable.

When a second (non-conforming) tape is wound in as the spacing means, it preferably is disposed in the roll in such manner that the edge of it, adjacent to the tubesheet, is spaced therefrom to form a continuous channel (with a foraminous "bottom") between the wraps of supporting tape. The latter tapes may also be perforated but this will generally not add much to the uniformity of flow distribution afforded by the latter channel. However, if both tapes make contact with the tubesheet, i.e., if the spacing tape also functions as a support tape, then perforation of the tapes is desirable.

It is not necessary that the spacing tape be narrower than the support tape, even though it is not to contact the tubesheet. If the two tapes are of the same width but are laterally offset before being wound, the tapes will function together as a single, self-spacing support tape. That is, the "upper" edge of one tape will contact the tubesheet and the "lower" edge of the other will contact the backing member. In this case, the two tapes of course must be held together by bonds of sufficient strength to withstand the shear forces which will be placed upon them.

When the "surface" of the support plate that contacts the backing member is grooved, this may be done in several ways. The "lower" edge of the support tape(s) may be vertically non-rectilinear, i.e., wavy, notched, serrated, etc., before being wound up; "channels" may be cut in the face of the plate after winding (or stacking and cutting) or, sheet rolls or stacks may be through-pierced by bores having their axes in the planes along which they will be sliced into plates.

Specific Plate Structures

Turning now to the drawings, FIG. 1 depicts a section of a square support plate made from tape lengths of unequal width and of different, non-nesting configurations. Lengths (1,1' and 1") of a supporting tape are separated by and bonded to lengths (2 and 2') of a currgated spacer tape. (The glue lines between the tapes are not shown.) It will be seen that lengths 1 (etc.) are wider than the lengths 2 (etc.) and the upper edges (3,3',3") of the wider lengths lie in a common plane which may be considered the major "surface" which would be placed against the tubesheet in a permeator. The lower edge (4) of each tape length is interrupted by a number of tunnels (5) through which the effluent passing through the support plate can flow to an egress port in the backing member (not shown). The significant dimensions of the structure, as shown, are identified as a, b, $w_1$, $w_2$, $t_1$, s and $t_2$ (see Example 3, herein).

Figure 2A:
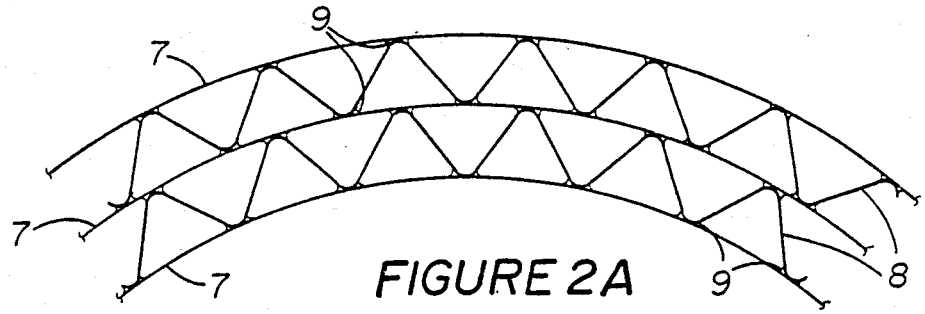
FIG. 2A is a horizontal cross-section of a portion of a disc-like supporting plate formed by rolling up together a flat and a corrugated tape.

FIG. 2A depicts an enlarged, "downwardly"-viewed, horizontal cross-section of a portion of a disc formed by rolling up together a smooth tape (7) and a corrugated tape (8), both of which function as support tapes. The tapes are of equal width and are bonded together by solvent-formed bonds (9). Their "lower" edges (not shown) are uninterrupted and the plate would have to be grooved or bear against a grooved or foraminous backing member (not shown).

Figure 2B:
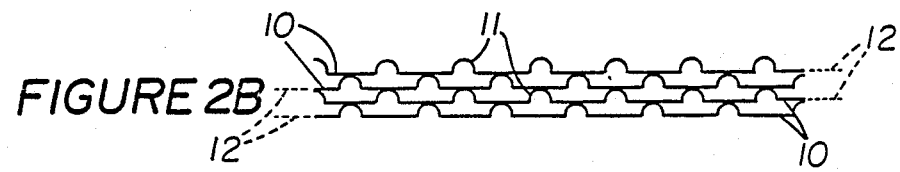
FIG. 2B is a similar view of a portion of a support plate made by stacking up and bonding thin, alternatingly-offset, metal sheets dented in a regular pattern and then trimming the edges of the stack and slicing it into plates.

In the plate section represented (in "downwardly"-viewed, horizontal cross-section) in FIG. 2B and described earlier herein, each of the "tape" lengths (10) defines a plurality of bulges ("dents", 11) which act as a spacing means. The portions (12) of the lengths cut-off in forming the plate from alternatingly off-set sheets are shown in phantom. The tape lengths are of the same width and were bonded together while still in sheet form (glue lines not shown). Again, the "lower" edges of the lengths are not adapted to permit effluent cross-flow and grooving of the plate surface or use of a transversely-grooved or foraminous backing member would be indicated.

A modification of the indicated method of forming plates from sheets stacked in an offset fashion would be to use sheets of ribbon shape, of a size such that a single cut is made to form two plates from the stack. If the protruding edges of the sheets are not cut off, plates in which every other "tape" edge will not contact the tubesheet but all of the opposed edges will contact the backing member will result.

Figure 2C:
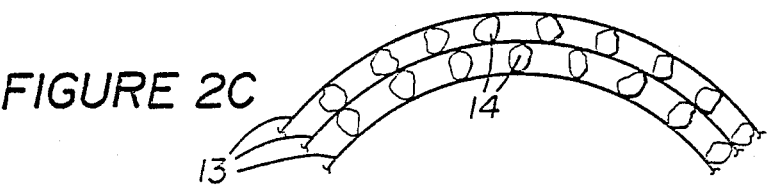
FIG. 2C is a cross-sectional view of a disc-like support plate made by rolling up a tape (shown in perspective in FIG. 2D) to which sand grains have been glued.
Figure 2D:
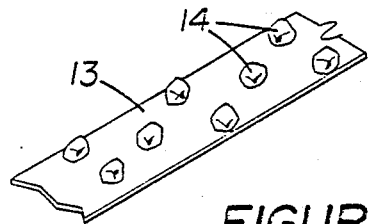

The support disc of which a portion is shown, in FIG. 2C, viewed from "above" in horizontal cross-section, is formed by rolling up a single length of rape (13)—shown unrolled in FIG. 2D—which itself incorporates the spacing means, a plurality of sprinkled-on particles (14) bonded to it by an adhesive coating applied to the particles or to the tape (glue lines not shown).

Figure 3:
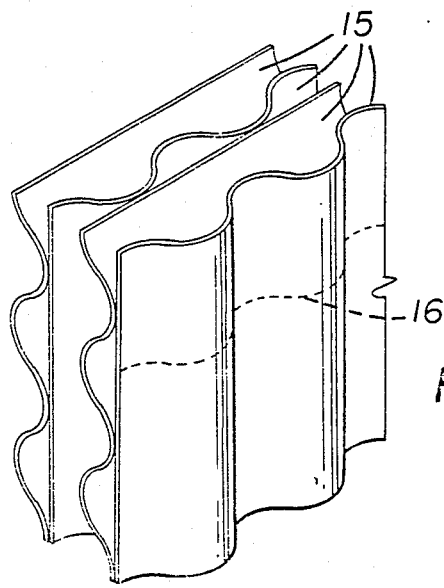
FIG. 3 is a perspective view of a portion of a "crisscrossed" stack of corrugated sheets which is to be bonded and cut into a plurality of rectangular support plates.

FIG. 3 depicts, in perspective, a corner portion of the first several layers in a criss-crossed stack of corrugated sheets (15) which may consist of a fiber-glass/resin composite, of a metal or of a ceramic (the term being used in its broadest sense), or any other otherwise suitable, rigid material. Although cutting with the aid of suitable clamps is considered feasible, it would be highly preferable to bond the sheets together first. The stack—clamped or bonded—is sliced into support plates (as by cutting in the plane in which the dashed surface line (16) lies).

It will be seen that effluent can be collected (by a groove in a conforming casing wall which communicates with an egress means therein, for example) from the periphery of a support plate of the type which would result; if this option is exercised, neither the "bottom" edges of the "tape" lengths nor the backing member need be adapted to permit transverse flow.

It will also be appreciated that, if desired, a circular cut can be made through a stack of sheets to form a disc-shaped supporting plate. Any sealing requisite to use of a peripheral collecting means would be more readily accomplished with a disc-shaped plate.

FIG. 4A shows the generally old combination of a cylindrical, permeator casing end section (17) having a reject egress fitting (18), a plurality of hollow fibers (19) having open ends potted in a resinous tubesheet (20), a bolted-on casing head (21)—which also serves as a backing member, and is pierced by the bore of an internally-threaded effluent (permeate) egress fitting (22), and a tubesheet support (23). The support, however, is a support of the present invention and is shown, enlarged, in FIG. 4B.

The support (23) comprises a central core (24) which is a remnant of a mandrel on which the support was formed by winding thereon a polycarbonate tape (25; only a few wraps shown) having sand particles (26) adhered to it on one side and coated with a bonding adhesive (not shown) on the other side. The lower edge of each wrap of the tape includes a number of lateral, flow-through openings (27) formed by radially grooving the bottom surface of the support (after the adhesive had set). The grooves convey the effluent from the spaces (28) between the wraps to the port (22).

FIG. 5A is an ideal representation of the surface of a tubesheet against which a supporting plate would bear. For convenience, a square tubesheet (29) comprising $n^2$ fibers (30) uniformly disposed in n rows of n fibers each is assumed. FIG. 5B is an enlarged view of part of rows 1 and 2 with sections of the edges (31) of three parallel lengths of supporting tape superimposed. The symbols $\theta$, $d_i$, $d_o$, s and w have the following meaning: $\theta$, the spacing between adjacent fiber rows and between the periphery of the tubesheet and the nearest fibers in each row or "column"; $d_i$, the inner (lumen) diameter of the fibers; $d_o$, the outer diameter of the fibers; s, the perpendicular distance between adjacent tape lengths and w, the width (thickness, actually) of the lengths.

FIG. 5C depicts a graphical "shorthand" representation of the relative positions of the tape edges and fibers shown in FIG. 2B. FIGS. 5D-F indicate the dimensions used to calculate the proportion of the lumens in a given fiber row blocked by the tape edges which underlie them and the total areas of contact between those edges and the wall ends of the fibers—for different conditions of overlap by three tape edges of different widths. The latter calculation is necessary in order to determine total contact area between each tape length and the tubesheet material, in turn essential to accurately estimating how wide and how far apart the tape wraps or lengths are to be for a given pressure load.

In each of FIGS. 5D, 5E and 5F, the perpendicular line (32) from the center of a chord to the arc the chort subtends is denoted as $x_1$ (for example). The area (a) of the segment between the arc and chord can be found from the x value and r by using the known relationships: $\cos(\gamma/2) = (r-x)/r$ and $a = \pi r^2 \gamma/360 - (r^2 \sin \gamma)/2$; for values of $x > r$, $\cos(\gamma/2) = (x=r)/r$. ($\gamma$ is the angle between the two radii to the ends of the arc.)

In using the model as depicted, several assumptions are made: (1) n is a relatively large number; (2) the ideal fiber spacing shown is equivalent to random spacing for a given fiber packing density (proportion of tubesheet surface occupied by fibers); (3) the results obtained for parallel tape lengths will hold closely for concentric or spiralled tapes or wraps spaced the same distance apart, and (4) the number of fiber rows and tape edges for which the lumen and fiber wall-end overlap areas must be successively calculated before the relative fiber row/tape positions in row 1 are repeated will be quite low in comparison to n.

To faciliate calculation of overlaps, the relationships above were used to develop the following Table 1, in which x is expressed as a percent of the diameter (D=2r) and a is expressed as a percent of A (the full circule area; $\pi r^2$). Using log/log paper, a smooth continuous plot of a vs. x can readily be made from the table.

TABLE 1

| x (% of D) | a (% of A) | x (% of D) | a (% of A) |
|---|---|---|---|
| 0 | 0.000 | 40 | 37.36 |
| 2 | 0.475 | 50 | 50.00 |
| 5 | 1.872 | 60 | 62.64 |
| 8 | 3.750 | 70 | 74.76 |
| 9 | 4.460 | 80 | 85.75 |
| 10 | 5.21 | 90 | 94.79 |
| 20 | 14.25 | 100 | 100.00 |
| 30 | 25.24 | | |

The following examples are for purposes of illustration and are not to be construed as limiting the present invention in a manner inconsistent with the claims appended to those specifications.

EXAMPLES

Example 1

Preparation and compression testing of solvent-welded, polycarbonate, wound tape discs.

A sheet of General Electric's LEXAN polycarbonate, 5 mils (0.005") thick, was slit into tape lengths 0.250" wide. One length was "corrugated" by passage between two meshing, knurling tools having 21 teeth per inch of circumference. The latter length (tape) and an unknurled tape were taken up together on and near an end of a rotating, 1 11/16" mandrel until the O.D. of the resulting roll (annular disc) was about 6 inches. The loose end was "glued" down by moistening it with dichloromethane (methylene chloride) and pressing for a few seconds. The mandrel end and disc were then dipped in a 70/30 by weight mixture of ethanol (alcohol) for a few seconds and then blown dry with air. The resulting support disc was examined under a binocular microscope and found to have essentially the structure shown in FIG. 2A. The number of tape-pair wraps per radial inch was about 37 and the radial distance between smooth tapes was 0.022". The peak-to-peak distance ("pitch") of the "waves" in the corrugated tape was 0.0476" and the porosity of the disc was calculated from its weight and dimensions to be 38.65%—assuming a density of 1.2 for the polycarbonate. For comparison the "porosity" of a tubesheet in which the fiber packing density is 60%, the fiber O.D. is 150 microns and the fiber I.D. is 90 microns, is $60 \times 45^2/75^2 = 21.6\%$. V-shaped, radial grooves, about 0.05" deep, were readily cut into one face of the disc with a razor blade.

Three test squares, 0.5" on a side, were cut out and their compression strengths determined in a Tinius-Olson machine (between two pieces of steel). The first yielding occurred at an average load of 6000 psi (two specimens a few psi less and the other somewhat more than 6000 psi). Discs were also wound from cellulose acetate butyrate tapes (Eastman Super-8 movie film). Knurling tools having 14 and 34 teeth per inch were also employed for tape corrugation. A mixture of 1,1,1-trichloroethane and methylene chloride was also found suitable for solvent bonding of polycarbonate tapes. (Examples 2 and 3 are not examples of the invention itself.)

Example 2

Graphical estimation of tape/lumen overlap and of tape/tubesheet resin contact area. Refer to FIG. 5.

A 10″×10″ square tubesheet surface with n rows of n fiber ends each was assumed. Taking $\theta$ as 20$\mu$, and $d_o$ as 150$\mu$, n was calculated to be 1494 and the total number of fibers $N=n^2$, to be 2,232,036. The fiber packing density, assuming uniform spacing as in FIG. 5A, was then calculated to be 61.14%. The values of $d_i$ and s were each taken as 90$\mu$ and a separate plot (as per FIG. 5C) made on graph paper for each of three tape thicknesses: $w_t=50\mu$, 100$\mu$ and 150$\mu$ (approximately 2, 4 and 6 mils, respectively). That is, each plot of the relative positions of successive tape edges and fiber rows was continued until the pattern of overlap for the first tape edge and fiber row was repeated. The number of successive "shifts" of positions to achieve pattern repeat for each tape thickness (tape edge width) was: 50$\mu$, 5 shifts; 100$\mu$, 19 shifts and 150$\mu$, 24, shifts. It was then necessary to calculate the lumen and fiber wall areas blocked or overlapped for 5, 19 and 24 patterns, respectively. It will be seen from FIGS. 5D, E and F that the size of each area to be added or subtracted to arrive at the desired figures could be read off from a plot of the numbers in Table 1 above.

It was verified that the error introduced by assuming that n is an integral multiple of the required number of shifts is negligible, so long as n is a large number.

The results of the calculations are given in the following Table 2. The maximum permissible pressure ($\Delta P$ max.) differential across the support disc is based on the compressive strengths of the tape and tubesheet materials, whichever is lower. The strength of the fiber wall material is ignored. The minimum compression strengths assumed for the tubesheet resin and tape material were 18,000 psi (epoxy) and 12,500 psi (polycarbonate), respectively.

TABLE 2

| Tape Thickness (Edge Width) | % Lumens Completely Blocked | Average % Blockage of Total Lumen Area | % Tape Edge Area in Contact With Epoxy |
|---|---|---|---|
| 50 $\mu$ | 0% | 33.70% | 39.80% |
| 100 $\mu$ | 10.53 | 52.58 | 40.05 |
| 150 $\mu$ | 29.17 | 62.71 | 38.65 |

| Tape Thickness | Area of Contact of Tape Edge With Epoxy | Maximum $\Delta P^*$ Across Support |
|---|---|---|
| 50 $\mu$ | 14.05 in$^2$ | 1756 |
| 100 $\mu$ | 21.08 | 2635 |
| 150 $\mu$ | 24.16 | 3020 |

*$\Delta P_{max} = \frac{12,500 \times \text{tape/epoxy contact area}}{100}$

Example 3

Estimation of $\Delta P$ max without determining extent of lumen blockage.

Referring to FIG. 1 but assuming the spacer tapes (2,2′, etc.) to be of same width as the support tapes, i.e., both tapes function as support tapes and $w_2=w_1$, the following values are assigned to the dimensions identified by letters in the drawing: a=0.076″, b=0.036″, $t_1=t_2=0.006″$ and s=0.038″. The number of "wraps" per "radial" inch is then $1\div(6+38+6=50$ mils$)=20$, the number of corrugations per lineal inch of wrap is $1\div(a+b=0.112″)=8.9286$ and the calculated tape edge area per "pitch" (corrugation) is 0.001536 in$^2$. The tape edge area in contact with each square inch of support plate surface is then $0.001536\times 8.9286\times 20=0.2743$ in$^2$. Assuming a fiber packing density of 65%, the portion of the tube-sheet surface occupied by resin (epoxy, for example) will be 35%; so (assuming uniform fiber distribution) only 35% of the tape edge area will be in contact with epoxy and the load ($\Delta P$ across the support) which can be borne by the tape without compression yield occurring will be $0.35\times 0.2743\times 12,500=1200$ psi (assuming polycarbonate tape with a compression yield strength of 12,500 psi is used).

If the uncorrugated tapes are assumed to be narrower than the corrugated tapes, i.e., only the latter function as support tapes, the calculated value of $\Delta P$ max is about 640 psi.

Metal Tapes

Although relatively expensive, expanded metal tapes may be employed, in roll form, as support plates of the present invention. Due to the lateral displacement (and work-hardening) that occurs during the process of manufacture of expanded metals, successive wraps of such tapes will not fit closely together (and are resistant to flattening). Although some nesting may occur, resistance to flow from face to face of the roll will not be high and lateral flow within the roll and at the interface with the backing member will be excellent.

Thus, although such tapes may be employed as spacer tapes, they are self-spacing and offer a simple way of forming a support plate. They are fabricated from metal sheets having thicknesses of from 2 to 5 mils by the Exmet Corporation (Bridgeport, Conn., U.S.A.), in a range of strand and opening sizes. The choice of metals is not limited to steel and, at least in narrower tape widths (suitable for the practise of the present invention), includes stainless steel, titanium, nickel alloys and other metals which are both strong and corrosion resistant.

It is believed that the limited contact between wraps of an expanded metal tape may be utilized to effect bonding by electric arc "tacking" (spot-welding).

At the other end of the cost spectrum, ordinary mild steel strapping tape can readily be dented or punched (to render it non-nesting) and coiled under substantial tension.

In the following claims, the term "mechanical restraining means" includes bonding or other means for fastening the inner and outer ends of tapes wrapped under tension. Also, reference to "notched" tape edges includes wave-form edges.

What is claimed is:

1. A method of making a foraminous plate having practical utility as an effluent—conveying support, between a hollow fiber tubesheet and a backing member, in a hollow fiber type permeability separatory device, said method comprising rolling up together a supporting tape and a spacing means, said tape having first and second edges which define corresponding first and second faces of the resulting coil or roll, said spacing means not extending across said tape as far as said first tape edge and, at the time that said tape and said means are being rolled up together, being so sized and shaped and so positioned between the tape wraps in the resulting coil or roll that said means occupies only a minor portion of the space between said wraps and does not prevent free flow of said effluent from said first face to said second face through the portion of said space not occupied by said means, and said coil or roll, as it exists immediately upon being formed by said rolling up, without being subjected to further treatment other than imposing on it such restraint against uncoiling as may be necessary, constituting said plate, in which said spacing means will not block off any hollow fiber lumens when said plate is placed between said tubesheet and said backing member with said first face against said tubesheet.

2. The method of claim 1 in which the second edge of the tape is notched or serrated.

3. The method of claim 1 in which said spacing means is itself a tape, of such configuration as not to nest with said supporting tape.

4. The method of claim 3 in which the two tapes are of the same width and the edges are spaced laterally apart so that one face of said coil or roll is defined by an edge of one tape and the other face is defined by an opposed edge of the other tape, said method additionally comprising:

(1) notching or serrating one of the two surface-defining edges, and (2) bonding the two tapes together at lines or surfaces of contact therebetween.

5. The method of claim 3 in which both tapes consist of plastic and additionally comprising bonding them together at lines or surfaces of contact therebetween.

6. The method of claim 5 in which both tapes consist of the same plastic and they are bonded by solvent-welding.

7. The method of claim 6 in which the plastic is a polycarbonate.

8. The method of claim 6 in which the plastic is a polycarbonate and the solvent employed for said bonding is a mixture of methylene chloride with either ethanol or 1,1,1-trichloroethane.

* * * * *